US009118753B2

(12) United States Patent
Harrison et al.

(10) Patent No.: US 9,118,753 B2
(45) Date of Patent: Aug. 25, 2015

(54) AUTONOMOUS SYSTEMS FOR REMOTE CONTROL OF HANDHELD DEVICES

(75) Inventors: David J. Harrison, Wayne, NJ (US); Charles J. Villa, Clark, NJ (US); Steve J. Nossen, Sommerset, NJ (US)

(73) Assignee: LGS INNOVATIONS LLC, Herndon, VA (US)

( * ) Notice: Subject to any disclaimer, the term of this patent is extended or adjusted under 35 U.S.C. 154(b) by 180 days.

(21) Appl. No.: 13/485,090

(22) Filed: May 31, 2012

(65) Prior Publication Data

US 2013/0326089 A1 Dec. 5, 2013

(51) Int. Cl.
*G06F 3/00* (2006.01)
*H04M 1/24* (2006.01)
*H04W 24/06* (2009.01)
*H04W 88/02* (2009.01)

(52) U.S. Cl.
CPC ................ *H04M 1/24* (2013.01); *H04W 24/06* (2013.01); *H04W 88/02* (2013.01)

(58) Field of Classification Search
USPC ............................................................. 710/5
See application file for complete search history.

(56) References Cited

U.S. PATENT DOCUMENTS

| 2005/0192002 A1* | 9/2005 | Varanda | 455/423 |
| 2008/0297346 A1* | 12/2008 | Brackmann et al. | 340/572.1 |
| 2009/0109216 A1* | 4/2009 | Uetabira | 345/419 |

FOREIGN PATENT DOCUMENTS

WO 2006/124105 A2 11/2006

OTHER PUBLICATIONS

International Search Report for PCT/US2013/042795 dated Oct. 14, 2013.

* cited by examiner

*Primary Examiner* — Chun-Kuan Lee
(74) *Attorney, Agent, or Firm* — Baker And Hostetler LLP

(57) ABSTRACT

A system for testing a communications network includes a controller having a computing device with a controller application and an operator having a microcontroller and a device interface module controlled by the microcontroller. A handheld communications device is operatively connected to the operator through the device interface module and adapted to communicate over the communications network being tested. The controller and the operator are connected by an out-of-band wireless control link to allow communication therebetween outside of the communications network being tested. The operator is adapted to receive commands from the controller over the out-of-band control link and, upon receipt of a command from the controller over the out-of-band control link, to initiate in-band communication on the handheld communications device over the communications network through the device interface module.

17 Claims, 8 Drawing Sheets

AUTONOMOUS SYSTEMS FOR REMOTE CONTROL OF HANDHELD DEVICES

FIELD OF THE INVENTION

The present invention relates to wireless systems.

BACKGROUND OF THE INVENTION

When developing and field testing communications systems that use handheld communications devices (e.g. push to talk radios, cell phones, smart phones, tablets and the like), the devices often need to be operated repeatedly at a variety of sites located away from a testing base of operations. Known procedures for effectuating remote operation of handheld communications devices during field testing involve stationing personnel in the field to manually operate the handheld communications devices.

Manual operation of handheld communications devices during field testing activities adds extra cost to tests by requiring additional personnel to be involved in the testing activities, i.e. increased headcount. For example, in a field test involving three handheld communications devices, three human operators might be required to execute the test plan, one for each device. Additionally, the cost for the testing activity may also increase because travel and support costs might also be absorbed for the human operators for the duration of the testing activity.

Manual operation of handheld communications devices during field testing activities may also result in human errors being introduced to the test results. For example, human error may occur due to fatigue, poor communications, or the like.

SUMMARY

According to an embodiment, a system for testing includes a controller operatively connected to a computing device to facilitate communication over an out-of-band control link and a microcontroller for communication with the controller over the out-of-band control link. The microcontroller controls a device interface module and is adapted to receive commands from the controller over the out-of-band control link and to initiate in-band communication using the device interface module upon receipt of a command from the controller over the out-of-band control link.

According to some embodiments, the system for testing includes a controller having a computing device with a controller application and a microcontroller controlling a device interface module. An out-of-band wireless control link connects the controller and the microcontroller to allow out-of-band communication therebetween. The microcontroller is adapted to receive commands from the controller over the out-of-band control link and to initiate in-band communication through the device interface module upon receipt of a command from the controller over the out-of-band control link.

According to an embodiment, an autonomous operator for remote control of a handheld device includes a microcontroller, a device interface module being operatively connected to the microcontroller, and an out-of-band communications system being operatively connected to the microcontroller. The out-of-band communications system allows the microcontroller to communicate with a controller over an out-of-band control link. The microcontroller is adapted to receive commands from the controller over the out-of-band control link and to initiate in-band communication through the device interface module upon receipt of a command from the controller over the out-of-band control link.

The operator may include an audio generator for providing unique audio messages to a handheld device through the device interface module to identify the operator and handheld device transmitting the in-band communication.

The operator may additionally include at least one of a GPS receiver, a tamper indicator and an RF detector to allow the operator to transmit the status message to the controller over the out-of-band control link to provide information relating to a health of the operator, a status of the handheld communications device, an operator location, a visual indication status and/or a tamper indication.

These and other embodiments of will become apparent in light of the following detailed description herein, with reference to the accompanying drawings.

DETAILED DESCRIPTION

Figure 1:
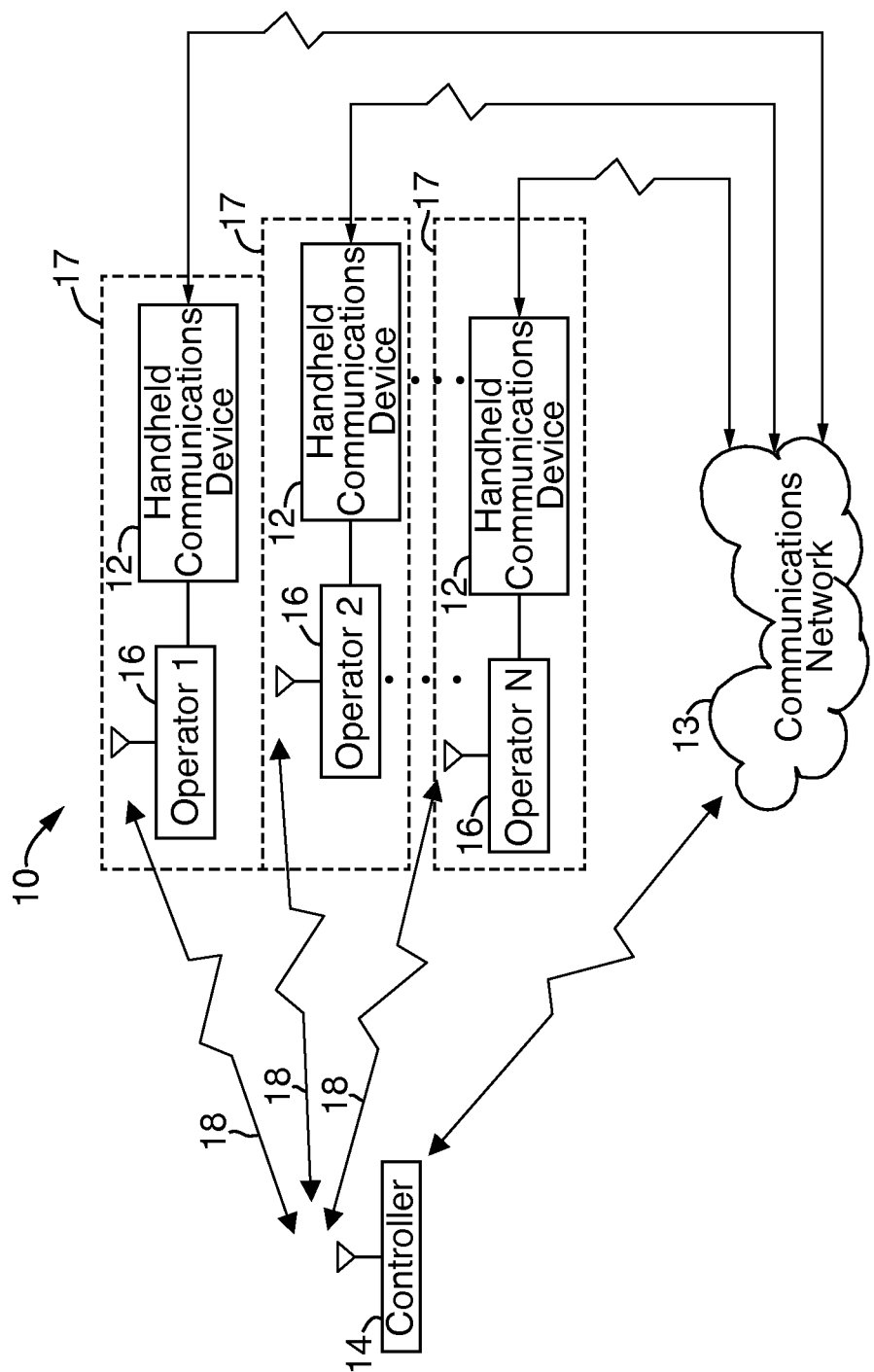
FIG. 1 is a schematic diagram of a system according to an embodiment.

Referring to FIG. 1, a system 10 for remote operation of one or more handheld communications devices 12 (e.g. push-to-talk radios, cell phones, smart phones, tablets, etc.) over a communications network 13 (e.g. a push-to-talk radio network, a cellular telephone network, etc.) includes a controller 14 and one or more operators 16. The one or more handheld communications devices 12 and operators 16 may be located at independent locations 17, away from the controller 12. The handheld communications devices 12 are operatively connected to the one or more operators 16, as will be discussed in greater detail below. The one or more operators 16 are in wireless communication with the controller 14 over an out-of-band wireless control link 18 (i.e. a control link that is outside of the communications network 13), thereby allowing the controller 14 and the operators 16 to communicate outside of the communications network 13 during testing of the communications network 13, or the like.

Figure 2:
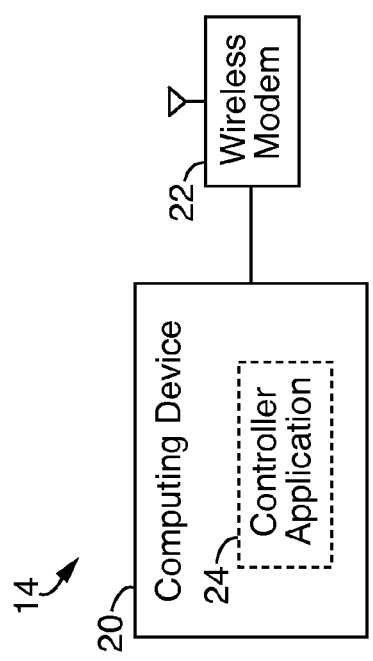
FIG. 2 is a schematic diagram of a controller of the system of FIG. 1 according to another embodiment.

Referring to FIG. 2, the controller 14 includes a computing device 20 that is operatively connected to a first wireless modem 22. The computing device 20 may be a personal computer or the like having the necessary electronics, memory, storage, data stores (including, but not limited to, databases), firmware, logic/state machines, microprocessors, communication links, displays or other visual or audio user interfaces and any other input/output interfaces to execute a controller application 24 on the computing device 20. The controller application 24 facilitates the control of the one or more operators 16, shown in FIG. 1.

The controller application 24 may include a graphical user interface that has one or more control inputs for each handheld communications device 12, shown in FIG. 1, and operator 16, shown in FIG. 1. For instance, the graphical user interface may include control inputs for each handheld communications device 12, shown in FIG. 1, such as a transmission on/off input for activating and deactivating device transmission, a transmission duration input for entering a duration that the transmission lasts and a transmission message input for entering an audio message that is to be transmitted. The graphical user interface may also include control inputs for controlling functions of each operator 16, shown in FIG. 1, as will be discussed in greater detail below.

The first wireless modem 22 enables the controller 14 to communicate with the one or more operators 16, shown in FIG. 1, over the out-of-band wireless control link 18, shown in FIG. 1. Thus, the controller 14 may be located at a central control point away from the handheld communications devices 12, shown in FIG. 1, while using the out-of-band wireless control link 18, shown in FIG. 1, to communicate with the one or more operators 16, shown in FIG. 1, which are connected to the handheld communications devices 12, shown in FIG. 1.

Figure 3:
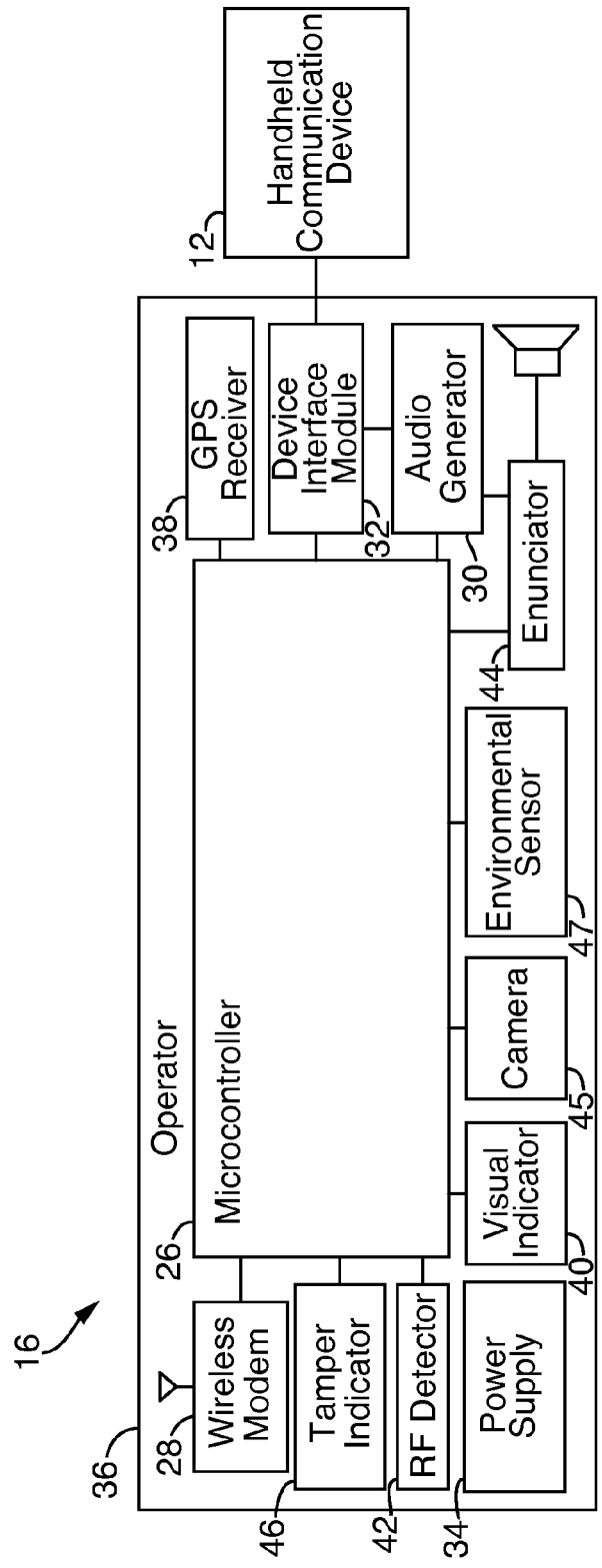
FIG. 3 is a schematic diagram of an operator of the system of FIG. 1 according to another embodiment.

Referring to FIG. 3, each operator 16 includes a microcontroller 26 with a second wireless modem 28, an audio generator 30 and at least one device interface module 32 connected thereto. The operator 16 may also include a power supply 34 such as a rechargeable battery, thereby allowing the operator 16 to function independently in the field without any support infrastructure. In some embodiments, the operator 16 may include an enclosure 36, such as a self-contained weather resistant enclosure, for housing the components therein.

The second wireless modem 28 enables the operator 16 to communicate with the controller 14, shown in FIG. 1, over the out-of-band wireless control link 18, shown in FIG. 1. The at least one device interface module 32 connects to an input of the handheld communications device 12, thereby allowing the operator 16 to control the handheld communications device 12. For example, in some embodiments the device interface module 32 may control handheld communications devices 12 that are push-to-talk radios. In these embodiments, the push-to-talk device interface module 32 connects to standard external microphone/audio input and push-to-talk controls typically found on push-to-talk radios. In some embodiments, the device interface module 32 of the operator 16 may be configured to interface to a handheld communications device 12 that is a cellular telephone, rather than a push-to-talk radio. In these embodiments, the device interface module 32 is a standard cellular telephone compatible interface such as Bluetooth or a headset cable.

The audio generator 30 allows the operator 16 to play a message unique to the operator 16 into the device interface module 32. The message may be a pre-recorded message stored at the operator 16 or a message sent from the controller 14, shown in FIG. 1, to the operator 16 via the out-of-band wireless control link 18, shown in FIG. 1. This unique message allows a test operator monitoring the system 10, shown in FIG. 1, to confirm which operator 16 is transmitting the message.

In some embodiments, the device interface module 32 may be modular and unique to the handheld communications device 12 being controlled by the operator 16 so that operator may have a common design that allows the operator 16 to interface with multiple brands or types of handheld communications devices 12. Additionally, in some embodiments, a single operator 16 may include multiple device interface modules 32 such that a single operator 16 may control multiple handheld communications devices 12. Advantageously, the multiple device interface modules 32 may be modular so that the number of handheld communications devices 12, being controlled by the operator 16 may be easily increase or decreased with the addition or subtraction of the device interface modules 32.

Still referring to FIG. 3, in some embodiments, the operator 16 may include a global positioning system ("GPS") receiver 38, a visual indicator 40 (e.g. a visible and/or infrared ("IR") strobe light), a radio frequency ("RF") energy detector 42, an external audio enunciator 44, a camera 45, a tamper indicator 46 and/or one or more environmental sensors 47 connected to the microcontroller 26. As should be understood by those skilled in the art, various subsets of these listed features may be included in the operator 16 depending upon a desired functionality for the operator 16. The GPS receiver 38 establishes a location of the operator 16 and may provide an accurate timing source for status logs keeping data on the status of the operator 16. The visual indicator 40 may be activated to visually indicate the location of the operator 16. The RF detector 42 includes an antenna (not shown), a band-pass filter (not shown) and an amplifier (not shown) and is tuned to be in-band with the communications network being tested to allow the operator 16 to provide a local monitor of the transmit energy of the communications network. The external audio enunciator 44 may be used to play a message, either transmitted from the controller 14 or pre-recorded in the operator 16, to a person located near the operator 16. The camera 45 allows the operator 16 to provide visual images at the remote location 17, such as camera stills or video recordings. In some embodiments, where the handheld device 12 is equipped with a camera, the operator 16 may simply control the camera of the handheld device 12 through the device interface module 32 to provide the visual images. The tamper indicator 46 may be provided to indicate intrusion into the operator 16 or removal of the operator 16 from its location. For instance, the tamper indicator 46 may include contact switches (not shown) on the enclosure 36, motion sensors (not shown) within the enclosure 36, position change detector (not shown) or any other similar means for tamper detection. The one or more environmental sensors 47 may include thermometers, barometers, altimeters, light sensors, moisture sensors or the like to provide environmental/weather data at the remote location 17, shown in FIG. 1, to the controller 14, shown in FIG. 1.

Referring back to FIG. 1, as discussed above, the out-of-band control link 18 of the system 10 may be formed by the first wireless modem 22, shown in FIG. 2, and the second wireless modem 28, shown in FIG. 3. However, as should be understood by those skilled in the art, in alternate embodiments, other out-of-band communications systems and out-of-band control links may be used instead of, or in addition to, the first modem 22, shown in FIG. 2, and second modem 28, shown in FIG. 3, to form the out-of-band control link 18. For instance, in some embodiments, a cellular data network or a satellite communication link may form the out-of-band control link 18. Additionally, the connection between the controller 14 and the out-of-band wireless control link 18 may be either through a direct connection or as part of a larger network.

In operation, the controller 14 may monitor various conditions at each operator 16 and/or transmit commands to each operator 16 via the out-of-band wireless control link 18. In some embodiments, the controller 14 allows for either manual or scripted commands to be sent to the one or more operators 16.

Figure 4:
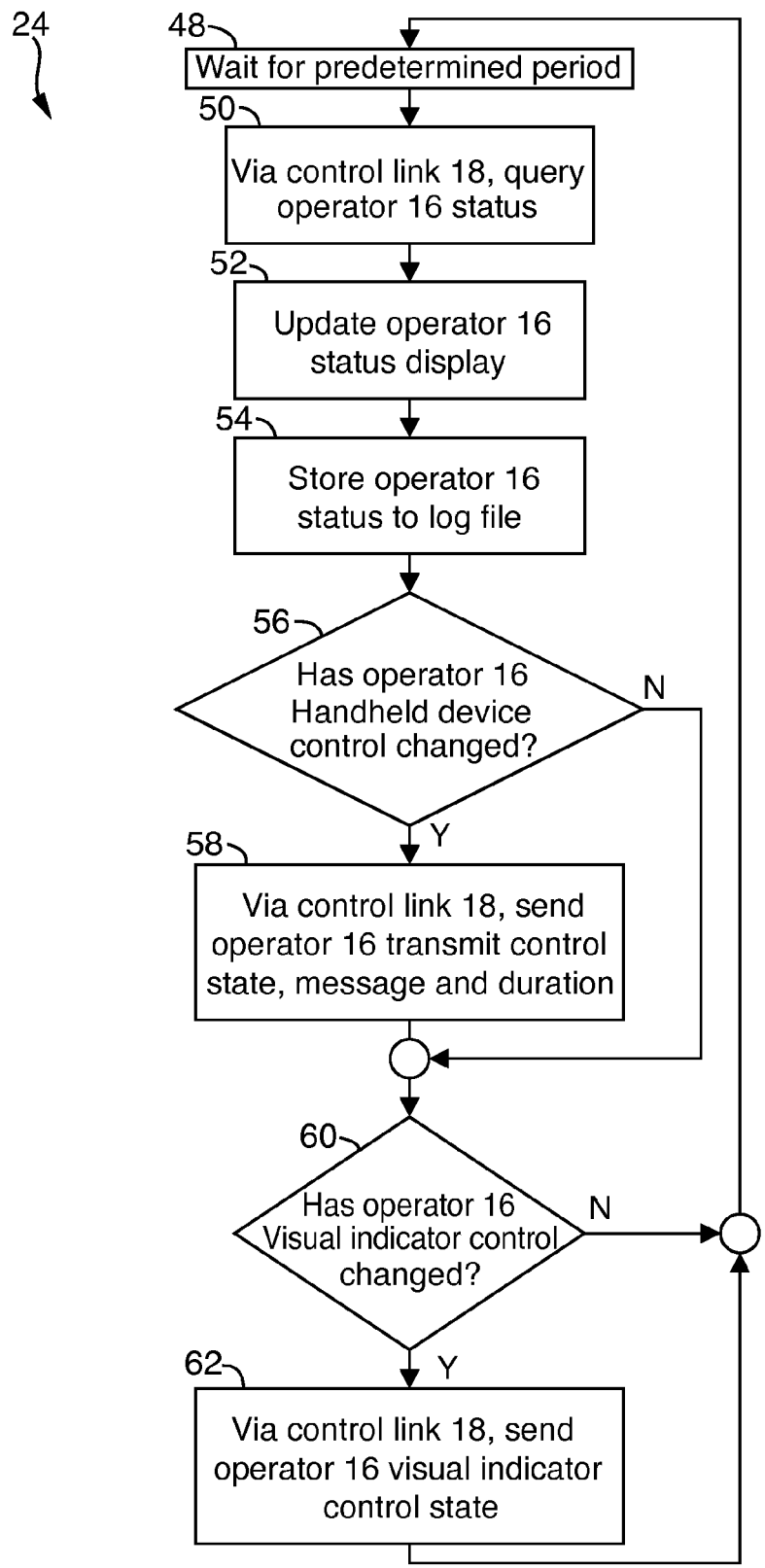
FIG. 4 is a flow diagram of an embodiment of a controller application of the controller of FIG. 2.

Referring to FIG. 4, an embodiment of the controller application 24 of the controller 14, shown in FIG. 1, for testing a push-to-talk radio network, where the handheld communications device 12, shown in FIG. 1, is a push-to-talk radio, is shown. Although the embodiment of the controller application 24 is being shown for control of a single operator 16, shown in FIG. 1, for simplicity, it should be understood by those skilled in the art that the steps shown in FIG. 4 may be executed by the controller application 24 simultaneously for a plurality of operators 16, shown in FIG. 1.

The controller application 24 may include an initial predetermined wait period 48 to allow for control of a rate at which the controller application 24 is executed. For instance, in some embodiments, the predetermined wait period 48 may cause the controller application 24 to repeat at a one (1) Hz rate.

Once the predetermined wait period 48 has elapsed, the controller application may query a status of the operator 16 via the out-of-band control link 18 at 50. The status of the operator 16 may include information including but not limited to a transmission state of the handheld communications device 12, shown in FIG. 1, a location of the operator 16 (e.g. map coordinates provided by the GPS receiver 38), a battery status of the power supply 34, a temperature of the operator 16, RF energy from the handheld communications device 12, shown in FIG. 1, as detected by the RF detector 42 and/or a status of the out-of-band control link 18.

The controller application 24 may display the status of the operator 16 through the graphical user interface on the controller 14, shown in FIG. 1, at 52. The status of the operator 16 may also be logged to a time-stamped log file stored on the controller 14, shown in FIG. 1, at 54. In some embodiments, the controller application 24 may generate alarms if parameters of the operator status become outside of acceptable ranges. For example, the controller application 24 may generate an alarm if the operator temperature becomes too low or high or if the battery voltage becomes too low. Thus, the controller 14, shown in FIG. 1, may monitor the status of the one or more operators 16, generate alarms based on the status, provide real time displays of the status and log the status for post analysis of test data.

At 56, the controller application 24 determines whether or not the transmission on/off input of the graphical user interface has been changed to an "on" state, for example by a test person. If the controller application 24 determines the transmission on/off input has been changed to an "on" state at 56, the controller application 24 sends a signal to the operator 16, shown in FIG. 1, via the out-of-band control link 18, at 58 providing the transmit "on" command as well as the transmit duration and the transmission message as entered through the graphical user interface. Thus, via the out-of-band control link 18, the controller 14, shown in FIG. 1, may command the operator 16 to initiate communications with the handheld communications device 12, shown in FIG. 1. If the transmission on/off input has not been changed, the controller application 24 does not send the signal at 58.

At 60, the controller application 24 determines whether or not a visual indicator on/off input for activating and deactivating the visual indicator 40, shown in FIG. 3, has been changed to an "on" state through the graphical user interface. If the controller application 24 determines the visual indicator on/off input has been changed to an "on" state at 60, the controller application 24 sends a signal to the operator 16, shown in FIG. 1, via the out-of-band control link 18, at 62 providing the visual indicator "on" command. If the visual indicator on/off input has not been changed to the "on" state, the controller application 24 does not send the signal at 62.

The controller application 24 then returns to the predetermined wait period at 48 and cycles through steps 48-62 to continue monitoring and commanding the operator 16, shown in FIG. 1.

As discussed above, steps 48-62 are performed by the controller 14, shown in FIG. 1, for each operator 16. For example, if three handheld communications devices 12, shown in FIG. 1, are being used with three operators 16 to test the push-to-talk radio network, the controller application 24 cycles through the steps at the predetermined rate for each operator 16.

Figure 5:
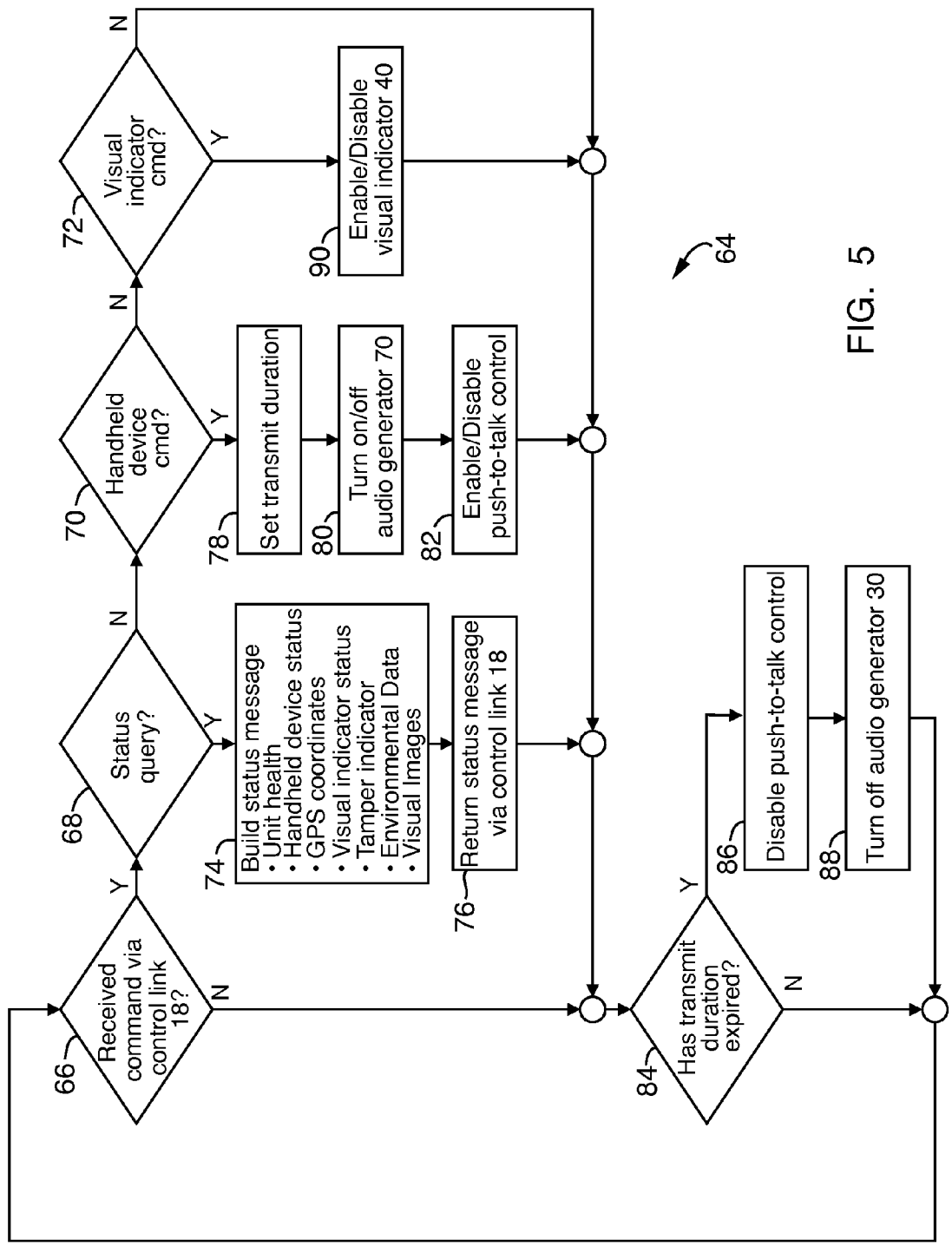
FIG. 5 is a flow diagram of an embodiment of an embedded application of the operator of FIG. 3.

Referring to FIG. 5, an embodiment of an embedded application 64 running on the operator 16, shown in FIG. 1, for testing a push-to-talk radio network, where the handheld communications device 12, shown in FIG. 1, is a push-to-talk radio, is shown. The embedded application 64 is run on the operator 16, shown in FIG. 1, in conjunction with the controller application 24, shown in FIG. 4, being run on the controller 14, shown in FIG. 1. In the embedded application 64, the operator 16, shown in FIG. 1, initially determines whether or not a command has been received from the controller 14, shown in FIG. 1, over the out-of-band control link 18 at 66. The command may be, for example, the status query 50, the transmission command 58 or the visual indicator command 62, all shown in FIG. 4.

If it is determined that a command has been received at 66, the embedded application 64 then determines whether the command is a status query at 68 (e.g. the query sent by the controller 14 at 50 in FIG. 4), a transmission command at 70 (e.g. the transmit command sent by the controller 14 at 58 in FIG. 4) or a visual indicator command at 72 (e.g. the visual indicator command sent by the controller 14 at 62 in FIG. 4).

If the embedded application 64 determines that the command is a status query at 68, the operator 16, shown in FIG. 1, builds a status message at 74 and transmits the status message to the controller 14, shown in FIG. 1, via the out-of-band control link 18 at 76. The status message built at 74 may include information including but not limited to an operational health of the operator 16, such as the battery status of the power supply 34, shown in FIG. 3, and the temperature of the operator 16, the status of the handheld communications device 12, shown in FIG. 1, such as a the transmission state and the RF energy from the handheld communications device 12, shown in FIG. 1, as detected by the RF detector 42, shown in FIG. 3, the location of the operator 16 (e.g. map coordinates provided by the GPS receiver 38, shown in FIG. 3), a status of the visual indicator 40, a tamper indication provided by the tamper indicator 46, environmental data provided by the environmental sensor 47 and/or visual images provided by the camera 45. Once built, the status message may be transmitted to the controller 14, shown in FIG. 1, via the out-of-band control link 18 at 76 to be displayed and/or stored by the controller 14, shown in FIG. 1, as discussed above in steps 52 and/or 54 of FIG. 4. The operator 16, shown in FIG. 1, then waits for a new command from the controller 14, shown in FIG. 1, to be transmitted over the out-of-band control link 18 at 66.

If the embedded application 64 determines that the command is a transmission command at 70, the operator 16, shown in FIG. 1, sets the transmission duration at 78, turns on the audio generator 30 at 80 and enables push-to-talk control of the handheld communications device 12, shown in FIG. 1, at 82 through the device interface module 32, shown in FIG. 3, which in the present embodiment is a push-to-talk interface module. This causes the handheld communications device 12, shown in FIG. 1, which is a push-to-talk device in the present embodiment, to transmit the unique message being generated by the audio generator 30 over the push-to-talk network that is being tested so that test personnel monitoring the system 10, shown in FIG. 1, may confirm which operator 16, shown in FIG. 1, is transmitting the message. Thus, via the out-of-band control link 18, the controller 14, shown in FIG. 1, may command the operator 16, shown in FIG. 1, to initiate in-band communications over the communications network 13, shown in FIG. 1, with the handheld communications device 12, shown in FIG. 1, through the device interface module 32, shown in FIG. 3. The audio message transmitted by the handheld communications device 12 may be a pre-recorded message stored in the operator 16 or may be a custom message transmitted to the operator 16 from the controller 14 over the out-of-band control link 18. The operator 16, shown in FIG. 1, determines when the transmission duration has expired at 84 and then disables push-to-talk control of the handheld communications device 12, shown in FIG. 1, at 86 through the device interface module 32, shown in FIG. 3, and turns off the audio generator 30, shown in FIG. 3, at 88. The operator 16, shown in FIG. 1, then waits for a new command from the controller 14, shown in FIG. 1, to be transmitted over the out-of-band control link 18 at 66.

Although the audio generator 30 has been described as generating unique audio messages to identify the handheld device 12, shown in FIG. 1, transmitting the message, in some embodiments, the operator 16, shown in FIG. 1, may also use the audio generator 30 to generate audio messages for transmission by the handheld communications device 12, shown in FIG. 1, other than the unique messages that are indicative of the identify of the handheld communications device 12, shown in FIG. 1. For example, the operator 16, shown in FIG. 1, may use the audio generator 30 to generate a message to test characteristics of an in-band network channel such as frequency response, transient response, or the like.

Still referring to FIG. 5, if the embedded application 64 determines that the command is a visual indicator command at 72, the operator 16, shown in FIG. 1, enables or disables the visual indicator 40 at 90, depending upon whether the command is to enable or disable the indicator. Enabling the visual indicator 40 at 90 may include, for example, activation of a strobe light, as discussed above, to visually indicate the location of the operator 16, shown in FIG. 1. The operator 16, shown in FIG. 1, then waits for a new command from the controller 14, shown in FIG. 1, to be transmitted over the out-of-band control link 18 at 66.

Referring to FIG. 4 and FIG. 5, the controller application 24 is able to use the out-of-band wireless control link 18 to continuously monitor the condition and status of the operator 16 and to allow control messages to be sent to the operator 16 to command the handheld communications device 12 to transmit an in-band message over the communications network 13, shown in FIG. 1, during testing and/or to visually indicate the location of the operator 16 through the visual indicator 40.

Figure 6:
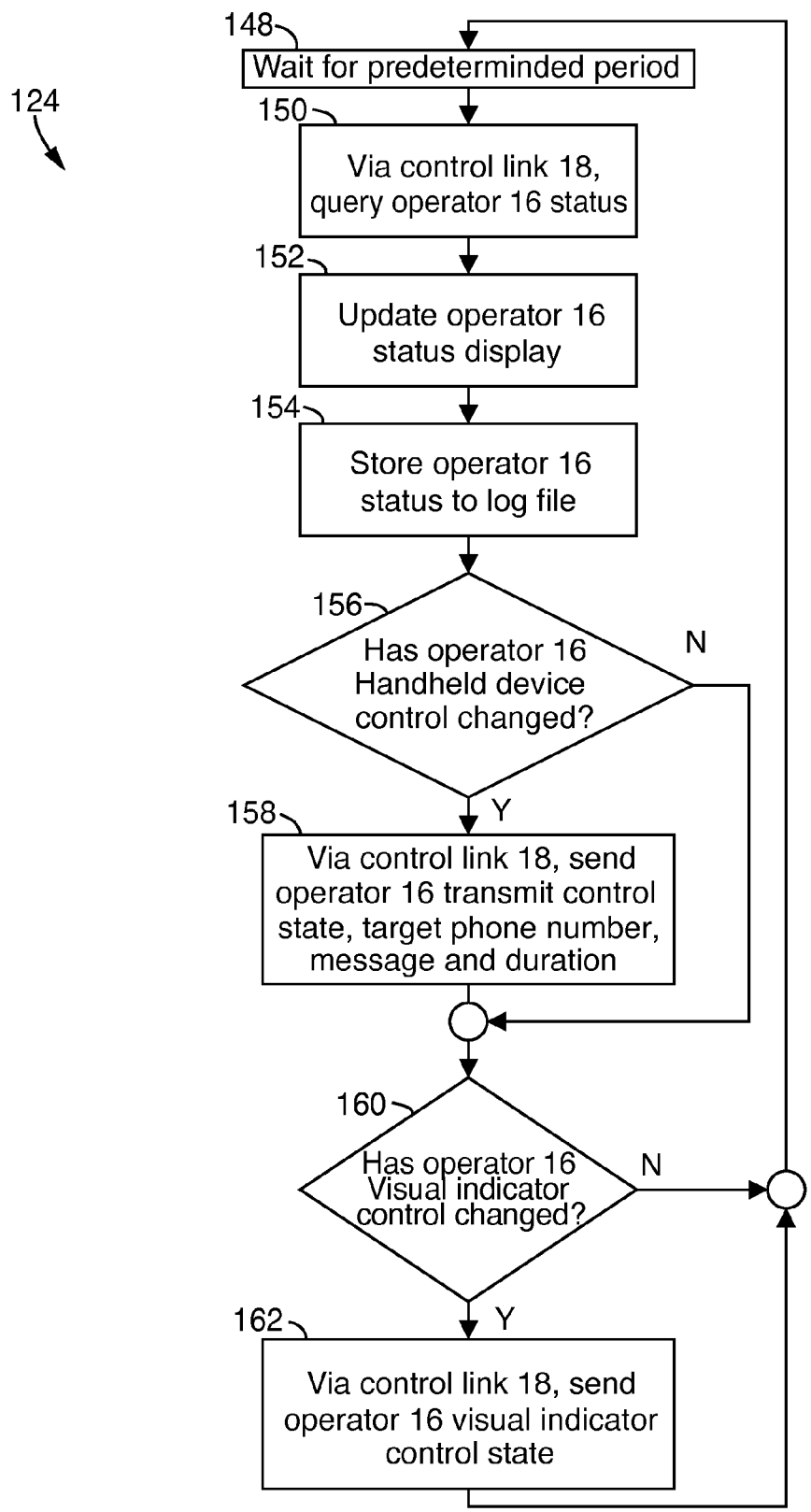
FIG. 6 is a flow diagram of another embodiment of the controller application of the controller of FIG. 2.

Referring to FIG. 6, wherein like numerals represent like elements, an embodiment of controller application 124 of the controller 14, shown in FIG. 1, for testing a cellular telephone network, where the handheld communications device 12, shown in FIG. 1, is a cellular telephone, is shown. This embodiment of the controller application 124 is being shown for control of a single operator 16 for simplicity, but it should be understood by those skilled in the art that the controller application 124 may be executed simultaneously for a plurality of operators 16. The controller application 124 is similar to the controller application 24, shown in FIG. 4, except that the controller application 124 includes a destination phone number for the operator 16 to call when a transmit command is sent at 158.

Specifically, like the controller application 24, shown in FIG. 4, the controller application 124 may include an initial predetermined wait period 148 to allow for control of a rate at which the controller application 124 is executed. For instance, in some embodiments, the predetermined wait period 148 may cause the controller application 124 to repeat at a one (1) Hz rate.

Once the predetermined wait period 148 has elapsed, the controller application may query a status of the operator 16 via the out-of-band control link 18 at 150. The status of the operator 16 may include information including but not limited to a transmission state of the handheld communications device 12, shown in FIG. 1, a location of the operator 16 (e.g. map coordinates provided by the GPS receiver 38, shown in FIG. 3), a battery status of the power supply 34, shown in FIG. 3, a temperature of the operator 16, a signal strength of the handheld communications device 12 in the communications network 13, both shown in FIG. 1, and/or a status of the out-of-band control link 18.

The controller application 124 may display the status of the operator 16 through the graphical user interface on the controller 14, shown in FIG. 1, at 152. The status of the operator 16 may also be logged to a time-stamped log file stored on the controller 14, shown in FIG. 1, at 154. In some embodiments, the controller application 124 may generate alarms if parameters of the operator status become outside of acceptable ranges. For example, the controller application 124 may generate an alarm if the operator temperature becomes too low or high or if the battery voltage becomes too low. Thus, the controller 14, shown in FIG. 1, may monitor the status of the one or more operators 16, generate alarms based on the status, provide real time displays of the status and log the status for post analysis of test data.

At 156, the controller application 124 determines whether or not the transmission on/off input of the graphical user interface has been changed to an "on" state, for example by the test person. If the controller application 124 determines the transmission on/off input has been changed to the "on" state at 156, the controller application 124 sends a signal to the operator 16, shown in FIG. 1, via the out-of-band control link 18, at 158 providing the transmit "on" command as well as the transmission duration, destination phone number and transmission message as entered through the graphical user interface. Thus, via the out-of-band control link 18, the controller 14, shown in FIG. 1, may command the operator 16 to initiate communications with the handheld communications device 12, shown in FIG. 1. If the transmission on/off input has not been changed, the controller application 24 does not send the signal at 158.

At 160, the controller application 124 determines whether or not the visual indicator on/off input for activating and deactivating the visual indicator 40, shown in FIG. 3, has been changed to an "on" state through the graphical user interface. If the controller application 124 determines the visual indicator on/off input has been changed to an "on" state at 160, the controller application 124 sends a signal to the operator 16, shown in FIG. 1, via the out-of-band control link 18, at 162 providing the visual indicator "on" command. If the visual indicator on/off input has not been changed to the "on" state, the controller application 124 does not send the signal at 162.

The controller application 124 then returns to the predetermined wait period at 148 and cycles through steps 148-162 to continue monitoring and commanding the operator 16, shown in FIG. 1.

As discussed above, steps 148-162 are performed by the controller 14, shown in FIG. 1, for each operator 16. For example, if three handheld communications devices 12, shown in FIG. 1, are being used with three operators 16 to test the cellular telephone network, the controller application 124 cycles through the steps at the predetermined rate for each operator 16.

Figure 7A:
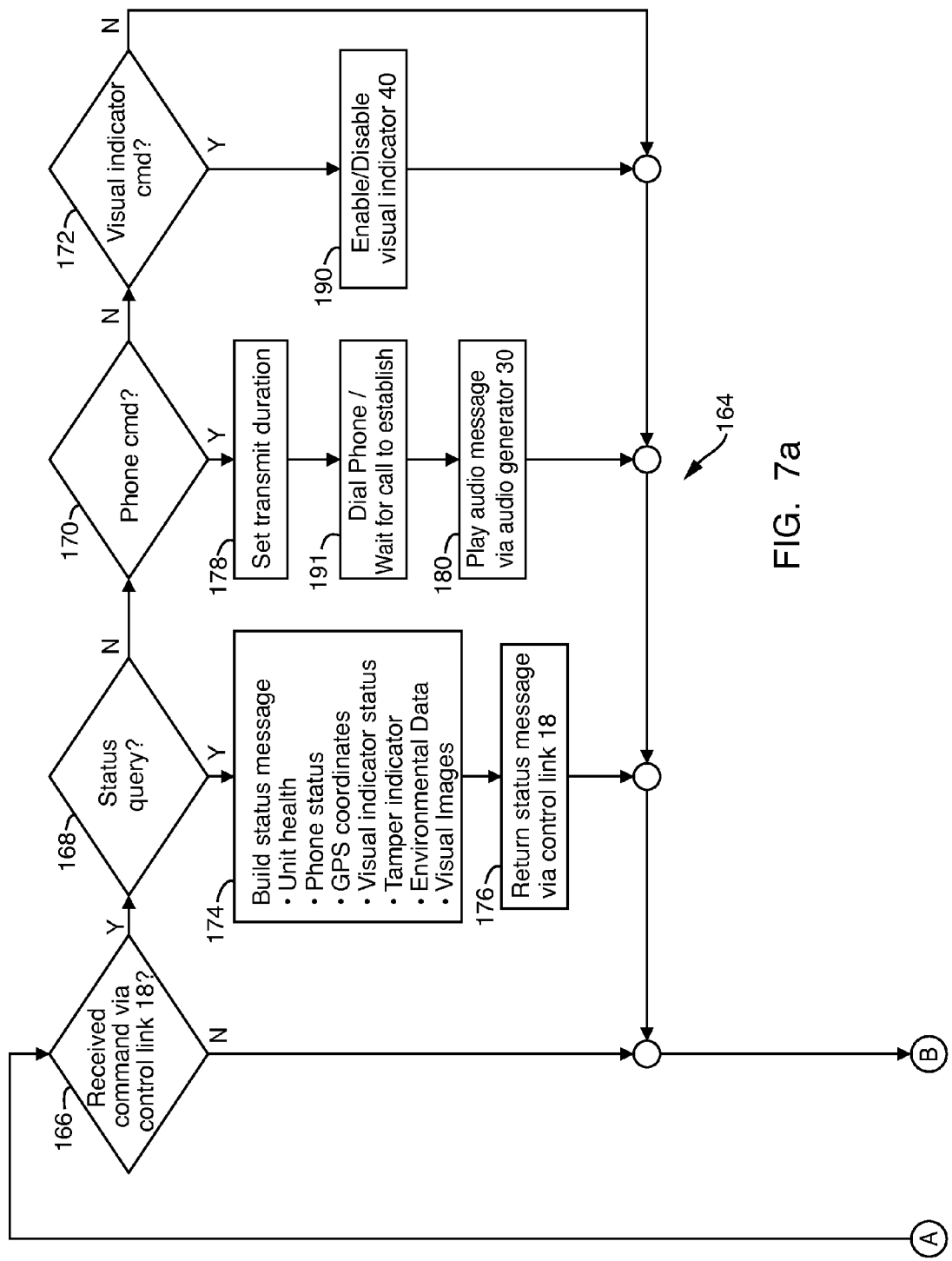
FIG. 7 is a flow diagram of another embodiment of the embedded application of the operator of FIG. 3.
Figures 7, 7A, 7B:
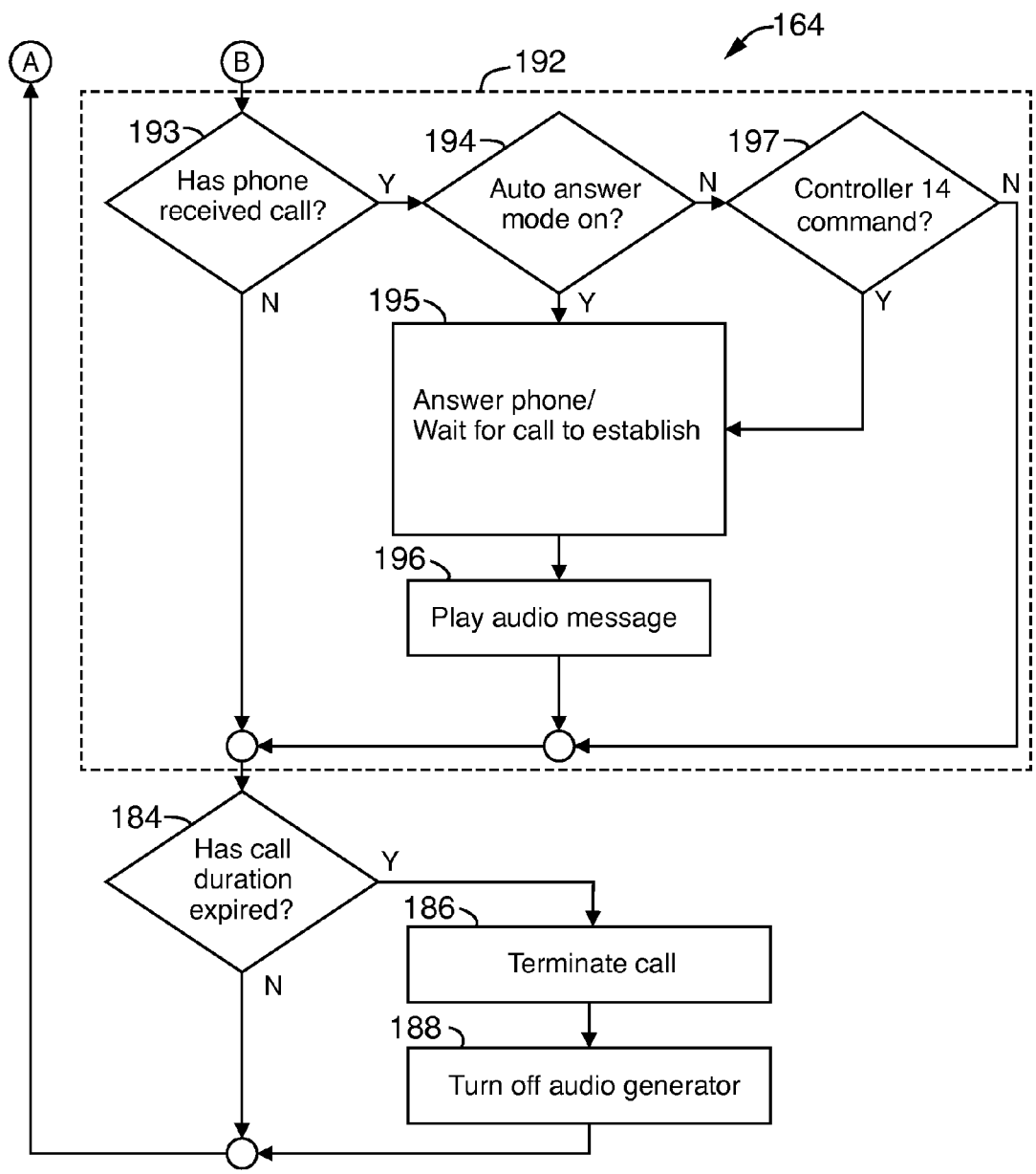

Referring to FIG. 7, an embodiment of an embedded application 164 running on the operator 16, shown in FIG. 1, for testing the cellular telephone network, where the handheld communications device 12, shown in FIG. 1, is a cellular telephone, is shown. The embedded application 164 is run on the operator 16, shown in FIG. 1, in conjunction with the controller application 124, shown in FIG. 6, being run on the controller 14, shown in FIG. 1. In the embedded application 164, the operator 16, shown in FIG. 1, initially determines whether or not a command has been received from the controller 14, shown in FIG. 1, over the out-of-band control link 18 at 166. The command may be, for example, the status query 150, the transmission command 158 or the visual indicator command 162, all shown in FIG. 6.

If it is determined that a command has been received at 166, the embedded application 164 then determines whether the command is a status query at 168 (e.g. the query sent by the controller 14 at 150 in FIG. 6), a transmission command at 170 (e.g. the transmit command sent by the controller 14 at 158 in FIG. 6) or a visual indicator command at 172 (e.g. the visual indicator command sent by the controller 14 at 162 in FIG. 6).

If the embedded application 164 determines that the command is a status query at 168, the operator 16, shown in FIG. 1, builds a status message at 174 and transmits the status message to the controller 14, shown in FIG. 1, via the out-of-band control link 18 at 176. The status message built at 174 may include information including but not limited to an operational health of the operator 16, such as the battery status of the power supply 34, shown in FIG. 3, and the temperature of the operator 16, the status of the handheld communications device 12, shown in FIG. 1, such as a the transmission state and the signal strength of the device 12, shown in FIG. 1, in the communications network 13, shown in FIG. 1, the location of the operator 16 (e.g. map coordinates provided by the GPS receiver 38, shown in FIG. 3), a status of the visual indicator 40, a tamper indication provided by the tamper indicator 46, shown in FIG. 3, environmental data provided by the environmental sensor 47, shown in FIG. 3, and/or visual images provided by the camera 45, shown in FIG. 3. Once built, the status message may be transmitted to the controller 14, shown in FIG. 1, via the out-of-band control link 18 at 176 to be displayed and/or stored by the controller 14, shown in FIG. 1, as discussed above in steps 152 and/or 154 of FIG. 6. The operator 16, shown in FIG. 1, then waits for a new command from the controller 14, shown in FIG. 1, to be transmitted over the out-of-band control link 18 at 166.

If the embedded application 164 determines that the command is a transmission command at 170, the operator 16, shown in FIG. 1, sets the transmission duration at 178 and dials the destination phone number on the handheld communication device 12, shown in FIG. 1, at 191 through the device interface module 32, shown in FIG. 3, which in the present embodiment is a cellular telephone interface module such as a Bluetooth headset, a wired headset or the like. The operator 16, shown in FIG. 1, waits for the call to be established and then plays the audio message via the audio generator 30, shown in FIG. 3, at 180. This causes the handheld communications device 12, shown in FIG. 1, which is a cellular telephone device in the present embodiment, to transmit the unique audio message being generated by the audio generator 30 over the cellular telephone network to the destination phone number so that test personnel monitoring the system 10, shown in FIG. 1, may confirm which handheld communications device 12, shown in FIG. 1, is transmitting the message. Thus, via the out-of-band control link 18, the controller 14, shown in FIG. 1, may command the operator 16, shown in FIG. 1, to initiate in-band communications with the handheld communications device 12, shown in FIG. 1, through the device interface module 32, shown in FIG. 3. The audio message transmitted by the handheld communications device 12 may be a pre-recorded message stored in the operator 16 or may be a custom message transmitted to the operator 16 from the controller 14 over the out-of-band control link 18. The operator 16, shown in FIG. 1, determines when the transmission duration has expired at 184 and then terminates the phone call at 186 through the device interface module 32, shown in FIG. 3. Finally, the operator 16, shown in FIG. 1, turns off the audio generator 30, shown in FIG. 3, at 188. The operator 16, shown in FIG. 1, then waits for a new command from the controller 14, shown in FIG. 1, to be transmitted over the out-of-band control link 18 at 166.

In some embodiments, the embedded application 164 may include an answer mode 192 that allows the handheld communications device 12, shown in FIG. 1, that is being controlled by the operator 16, shown in FIG. 1, to be automatically answered or allows the controller 14, shown in FIG. 1, to command that the handheld communications device 12, shown in FIG. 1, be answered in the even that the handheld communications device 12, shown in FIG. 1, receives a phone call. In the answer mode 192, the operator 16, shown in FIG. 1, first determines if a phone call has been received by the handheld communications device 12, shown in FIG. 1, at 193. If a call has been received, the operator 16, shown in FIG. 1, determines whether or not auto-answer mode is on at 194. If auto-answer mode is on, the operator 16, shown in FIG. 1, answers the phone through the device interface module 32, shown in FIG. 3, and waits for the call to establish at 195. Once the call is established, the operator 16, shown in FIG. 1, plays the audio message via the audio generator 30, shown in FIG. 3, at 196. If the operator 16, shown in FIG. 1, determines that auto-answer mode is not on at 194, the operator 16, shown in FIG. 1, evaluates whether or not the controller 14 commands that the call be answered at 197. If the controller 14 commands that the call be answered, the operator 16, shown in FIG. 1, answers the phone through the device interface module 32, shown in FIG. 3, and waits for the call to establish at 195. Once the call is established, the operator 16, shown in FIG. 1, plays the audio message via the audio generator 30, shown in FIG. 3, at 196.

Although the audio generator 30 has been described as generating unique audio messages to identify the handheld device 12, shown in FIG. 1, transmitting the message, as discussed above, the operator 16, shown in FIG. 1, may also use the audio generator 30 to generate audio messages for transmission by the handheld communications device 12, shown in FIG. 1, other than the unique messages that are indicative of the identify of the handheld communications device 12, shown in FIG. 1. For example, the operator 16, shown in FIG. 1, may use the audio generator 30 to generate a message to test characteristics of an in-band network channel such as frequency response, transient response, or the like.

Still referring to FIG. 7, if the embedded application 164 determines that the command is a visual indicator command at 172, the operator 16, shown in FIG. 1, enables or disables the visual indicator 40 at 190, depending upon whether the command is to enable or disable the indicator. Enabling the visual indicator 40 at 190 may include, for example, activation of a strobe light, as discussed above, to visually indicate the location of the operator 16, shown in FIG. 1. The operator 16, shown in FIG. 1, then waits for a new command from the controller 14, shown in FIG. 1, to be transmitted over the out-of-band control link 18.

Referring to FIG. 6 and FIG. 7, the controller application 124 is able to use the out-of-band wireless control link 18 to continuously monitor the condition and status of the operator 16 and to allow control messages to be sent to the operator 16 to command the handheld communications device 12 to transmit an in-band message over the communications network 13, shown in FIG. 1, during testing and/or to visually indicate the location of the operator 16 through the visual indicator 40.

Figure 8:
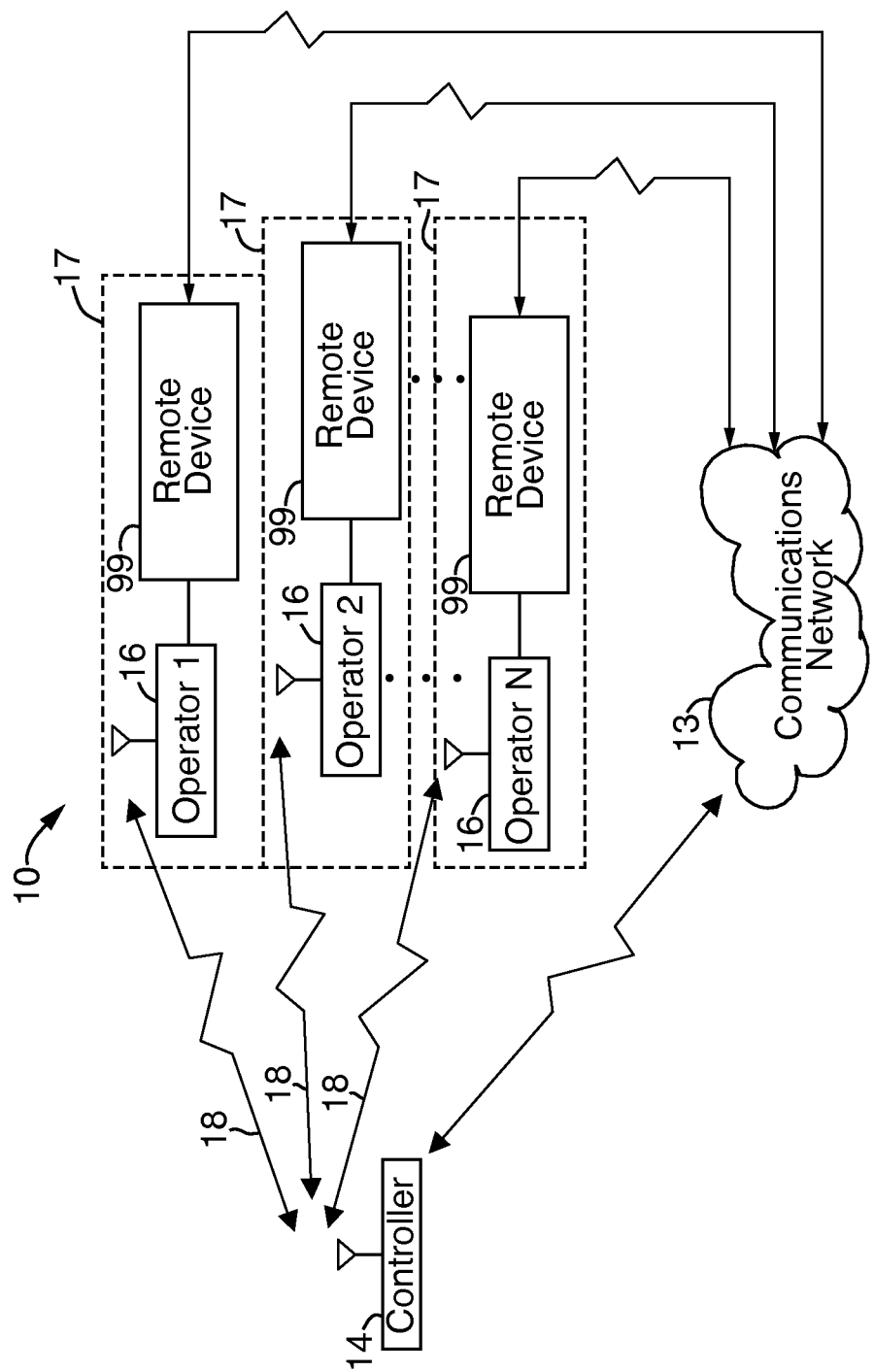
FIG. 8 is a schematic diagram of a system according to another embodiment.

Although the system 10, shown in FIG. 1, has been described in connection with the control of handheld communications devices 12, shown in FIG. 1, referring to FIG. 8, in some embodiments, the system 10 may control remote devices 99 that are not necessarily handheld communications devices 12, shown in FIG. 1. For example, the system 10 may be used for testing a communications network 13 that is a fixed point-to-point wireless communications system that implements both RF and optical communications channels. In these embodiments, the remote devices 99 may be communications devices in the fixed point-to-point wireless communications network such as laptop computers having wireless modems or the like. In these embodiments, the remote devices 99 are connected to and controlled by the operators 16 in substantially the same manner discussed above in connection with the handheld devices 12, shown in FIG. 1.

The system 10, shown in FIG. 1, advantageously aids in the remote operation of handheld communications devices 12 used for field testing activities by allowing automated remote operation and monitoring of the devices 12 without a need for remotely located human personnel. Thus, the system 10, shown in FIG. 1, facilitates the testing and evaluation of wireless communications networks and devices by reducing field testing expenses through a reduction in the headcount of test personnel necessary to execute a test and through the elimination of costs associated with supporting test personnel such as travel and living expenses for supporting test personnel for the duration of the field test.

The system 10, shown in FIG. 1, also advantageously improves the quality of test results obtained from testing the communications network 13, shown in FIG. 1, by reducing human error due to fatigue, poor communication, and the like, by eliminating the need to station test personnel in the field to manually operate the handheld communications devices 12, shown in FIG. 1, in accordance with a test plan.

Although this invention has been shown and described with respect to the detailed embodiments thereof, it will be understood by those skilled in the art that various changes in form and detail thereof may be made without departing from the spirit and the scope of the invention. For example, a person of skill in the art would readily recognize that steps of various above-described methods of operation may be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks or tapes, hard drives, or optically readable digital data storage media. The embodiments are also intended to cover computers programmed to perform said steps of methods of operation described herein. It should be appreciated by those skilled in the art that any block diagrams herein represent conceptual views of illustrative circuitry embodying the principles of the invention. Similarly, it will be appreciated that any flow charts, flow diagrams, and the like represent various processes which may be substantially represented in computer readable medium and so executed by a computer or processor, whether or not such computer or processor is explicitly shown.

What is claimed is:

1. A system for testing comprising:
   a controller operatively connected to a computing device to facilitate communication over an out-of-band control link;
   a microcontroller for communication with the controller over the out-of-band control link, the microcontroller controlling a device interface module and including a position reporting system providing a location of the microcontroller to the controller over the out-of-band control link;
   a handheld device operatively connected to the device interface module; and
   an audio generator operatively connected to the microcontroller for providing audio messages to the handheld device through the device interface module, wherein
   the microcontroller is adapted to receive a command from the controller over the out-of-band control link,
   the microcontroller determines whether the command is a status query command, transmission command or a visual indicator command,
   the microcontroller initiates in-band communication using the device interface module upon receipt of the command from the controller over the out-of-band control link, and
   the audio generator is configured to generate a unique audio message to identify the handheld device.

2. The system according to claim 1, further comprising a visual indicator being operatively connected to the microcontroller, wherein the controller is adapted to command activation of the visual indicator over the out-of-band control link.

3. The system according to claim 2, wherein the visual indicator includes a strobe light.

4. The system according to claim 1, wherein the microcontroller is disposed in a weather resistant enclosure.

5. The system according to claim 1, further comprising at least a second device interface module controlled by the microcontroller.

6. The system according to claim 1, further comprising a GPS receiver, a tamper indicator and an RF detector operatively connected to the microcontroller.

7. The system according to claim 6, wherein the microcontroller is adapted to transmit a status message to the controller over the out-of-band control link to provide information relating to a health of the operator, a status of the handheld device, an operator location, a visual indication status or a tamper indication.

8. The system of claim 1, wherein the handheld device is a push-to-talk radio.

9. A system for testing comprising:
   a controller including a computing device having a controller application;
   a microcontroller, the microcontroller controlling a device interface module;
   an out-of-band wireless control link connecting the controller and the microcontroller to allow out-of-band communication therebetween;

a handheld device operatively connected to the device interface module; and an audio generator operatively connected to the microcontroller for providing audio messages to the handheld device through the device interface module, wherein the microcontroller includes a position reporting system providing a location of the microcontroller to the controller over the out-of-band wireless control link, the microcontroller is adapted to receive a command from the controller over the out-of-band control link, the microcontroller determines whether the command is a status query command, transmission command or a visual indicator command, the microcontroller initiates in-band communication through the device interface module upon receipt of the command from the controller over the out-of-band control link, and the audio generator is configured to generate a unique audio message to identify the handheld device.

10. The system according to claim 9, wherein the out-of-band control link is formed by a first modem at the controller in point-to-point communication with a second modem operatively connected to the microcontroller.

11. The system according to claim 9, wherein the out-of-band control link is formed by a cellular data network separate from a communications network in which the in-band communication is initiated.

12. The system according to claim 9, wherein the out-of-band control link is formed by a satellite communication link.

13. An autonomous operator for remote control of a handheld device, the autonomous operator comprising:

a microcontroller;

a device interface module being operatively connected to the microcontroller;

an out-of-band communications system being operatively connected to the microcontroller, the out-of-band communications system allowing the microcontroller to communicate with a controller over an out-of-band control link; and a position reporting system providing a location of the autonomous operator to the controller via the out-of-band communications;

a handheld device operatively connected to the device interface module; and an audio generator operatively connected to the microcontroller for providing audio messages to the handheld device through the device interface module, wherein the microcontroller is adapted to receive a command from the controller over the out-of-band control link, the microcontroller determines whether the command is a status query command, transmission command or a visual indicator command, the microcontroller initiates in-band communication through the device interface module upon receipt of the command from the controller over the out-of-band control link, and the audio generator is configured to generate a unique audio message to identify the handheld device.

14. The autonomous operator according to claim 13, additionally comprising a visual indicator;

wherein the controller commands activation of the visual indicator over the out-of-band control link.

15. The autonomous operator according to claim 14, wherein the visual indicator includes a strobe light.

16. The autonomous operator according to claim 13, additionally comprising a weather resistant enclosure.

17. The autonomous operator according to claim 13, additionally comprising at least one of a GPS receiver, a tamper indicator and an RF detector operatively connected to the microcontroller and allowing the operator to transmit a status message to the controller over the out-of-band control link to provide information relating to a health of the operator, a status of the handheld communications device, an operator location, a visual indication status or a tamper indication.

* * * * *